United States Patent
Ickman et al.

(10) Patent No.: US 8,775,400 B2
(45) Date of Patent: Jul. 8, 2014

(54) EXTRACTING FACTS FROM SOCIAL NETWORK MESSAGES

(75) Inventors: Steven W. Ickman, Snoqualmie, WA (US); Patrick A. Kinsel, Seattle, WA (US); Nathanael P. Roberton, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/827,070

(22) Filed: Jun. 30, 2010

(65) Prior Publication Data
US 2012/0005221 A1 Jan. 5, 2012

(51) Int. Cl.
*G06F 17/30* (2006.01)
(52) U.S. Cl.
USPC ............ 707/707; 707/708; 707/770; 707/771
(58) Field of Classification Search
USPC ................................. 707/707, 708, 770, 771
See application file for complete search history.

(56) References Cited

U.S. PATENT DOCUMENTS

| | | | |
|---|---|---|---|
| 7,257,530 B2 | 8/2007 | Yin | |
| 7,389,324 B2 | 6/2008 | Masonis et al. | |
| 7,599,918 B2 | 10/2009 | Shen et al. | |
| 7,908,554 B1 * | 3/2011 | Blattner | 715/706 |
| 8,078,197 B2 * | 12/2011 | Gutierrez et al. | 455/456.3 |
| 2005/0256905 A1 * | 11/2005 | Gruhl et al. | 707/104.1 |
| 2006/0010029 A1 * | 1/2006 | Gross | 705/10 |
| 2007/0048703 A1 * | 3/2007 | Rosen | 434/235 |

(Continued)

FOREIGN PATENT DOCUMENTS

| CN | 101257512 A | 9/2008 |
|---|---|---|
| KR | 1020020010226 A | 2/2002 |

(Continued)

OTHER PUBLICATIONS

"All That Twitters Isn't Gold: A Popular Web Application in Search of a Business Plan"—Published Date: Apr. 15, 2009 http://knowledge.wharton.upenn.edu/article.cfm?articleid=2202.

(Continued)

*Primary Examiner* — Debbie Le
(74) *Attorney, Agent, or Firm* — Dan Choi; Carole Boelitz; Micky Minhas (57) ABSTRACT

Within a social network, users may submit various types of messages, such as personal messages to other users and status messages to be shared with all associated users. While these messages often relate to highly personal information such as opinions and personal emotions, such messages may also comprise one or more facts about a particular topic, such as a report of a weather condition in a particular location at a particular time. These facts may be identified in various messages, and may be stored in a fact store, such that when a user submits a query specifying a topic may receive from the fact store one or more facts that are responsive to the topic of the query. Additionally, user interfaces may be devised and provided to users submitting such messages, e.g., in order to reduce ambiguity and improve the reliable extraction of facts from messages.

20 Claims, 8 Drawing Sheets

(56) References Cited

U.S. PATENT DOCUMENTS

| | | | |
|---|---|---|---|
| 2007/0143317 A1* | 6/2007 | Hogue et al. | 707/100 |
| 2008/0189388 A1* | 8/2008 | Khare et al. | 709/217 |
| 2008/0255929 A1* | 10/2008 | Mouton | 705/10 |
| 2009/0132581 A1* | 5/2009 | Ahlberg | 707/102 |
| 2009/0162824 A1 | 6/2009 | Heck | |
| 2009/0282121 A1 | 11/2009 | Robertson et al. | |
| 2009/0307196 A1 | 12/2009 | Shuster | |
| 2009/0319577 A1 | 12/2009 | Obasanjo et al. | |
| 2010/0299326 A1* | 11/2010 | Germaise | 707/728 |
| 2011/0035377 A1* | 2/2011 | Wang et al. | 707/737 |
| 2011/0055017 A1* | 3/2011 | Solomon et al. | 705/14.66 |
| 2011/0238608 A1* | 9/2011 | Sathish | 706/47 |
| 2011/0238762 A1* | 9/2011 | Soni et al. | 709/206 |
| 2011/0238763 A1* | 9/2011 | Shin et al. | 709/206 |
| 2011/0270517 A1* | 11/2011 | Benedetti | 701/201 |
| 2011/0282880 A1* | 11/2011 | Krichman et al. | 707/741 |
| 2012/0052882 A1* | 3/2012 | Gutierrez et al. | 455/456.3 |

FOREIGN PATENT DOCUMENTS

| | | | |
|---|---|---|---|
| KR | 1020080038605 A | 5/2008 | |
| WO | 2009030990 A1 | 3/2009 | |
| WO | 2010001406 A1 | 1/2010 | |
| WO | 2012012080 A2 | 1/2012 | |

OTHER PUBLICATIONS

"Workshop on Social Networks and Social Media Mining on the Web (SNSMW)"—Published Date: Apr. 1-4, 2010 http://www.nishilab.sys.es.osaka-u.ac.jp/SNSMW/.

Eagle; et al., "Common Sense Conversations: Understanding Casual Conversation using a Common Sense Database"—Published Date: Aug. 2003 http://web.media.mit.edu/~push/CommonSenseConversations.pdf.

Lin; et al., "SmallBlue: Social Network Analysis for Expertise Search and Collective Intelligence"—Retrieved Date: Jan. 28, 2010, http://www.cs.ucsb.edu/~xyan/papers/icde09_smallblue.pdf.

Gursel; et al., "Improving Search in Social Networks by Agent Based Mining"—Retrieved Date: Jan. 28, 2010, pp. 2034-2039, http://ijcai.org/papers09/Papers/IJCAI09-335.pdf.

Locoro; et al., "Semantic Annotation and Tagging in the KP-LAB Environment: Mining the Learning and Knowledge Dynamics"—Retrieved Date: Jan. 28, 2010, pp. 572-576 http://www.formatex.org/micte2009/book/572-576.pdf.

"International Search Report", Mailed Date: Feb. 20, 2012, Application No. PCT/US2011/041584, Filed Date: Jun. 23, 2011, pp. 8.

Chinese Office Action in Chinese Application No. 201180032286.6 dated Jun. 28, 2013, 11 pgs.

Second Chinese Office Action in Chinese Application No. 201180032286.6 dated Mar. 10, 2014, 10 pgs.

* cited by examiner

EXTRACTING FACTS FROM SOCIAL NETWORK MESSAGES

BACKGROUND

Within the field of computing, many scenarios involve aspects of social networking, wherein users may establish associations representing relationships with other users, and may share data of interest with all or some associated users. In this context, a user may establish a social profile comprising data that identifies various aspects of the user to associated users, such as demographic information, a set of interests such as hobbies or professional skills, and a set of resources that are interesting to the user. Users may consent to having some aspects of his or her social profile shared; e.g., a user might generate a message (such as a personal status, a note about a particular topic, or a message directed to another user) that may initially be accessible only to users who are associated with the user, but may permit an associated user to repost the message for access by all of the users associated with the associated user (e.g., a friend of a user may be permitted to take the user's message and repost it to grant access to the friend's friends.) In this manner, data shared over a social network (and, in particular, data comprising the social profile of a user) may be propagated in select ways to others via the social network.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Messages published within social networks often relate to highly personal, trivial, or ephemeral topics (e.g., opinions, reflections, and emotions), but may also include objective facts (e.g., observations and discoveries.) A user may publish a message about an experience on a trip, such as "Having a great time on vacation! The weather is beautiful!" While this message primarily relates to the personal experiences of the individual, it may also be viewed as a personal report of several facts, such as the location of the individual at a particular time and the weather observed at that location.

The social network may be configured to, in addition to receiving and exchanging these messages, identify the facts expressed in each message, and to collect the reported experiences and observations of the users in the messages. For example, each fact may be associated with a topic, such as a weather condition in a particular location, and the messages may be evaluated to identify an indication of a topic and a fact associated with that topic. These collected facts may be stored in a fact store, such as a database, comprising a body of facts associated with a topic according to the users of the social network. These facts may then be utilized to answer queries of users of the social network regarding these topics in a convenient manner. The answers may also indicate a degree of reliability of the answer (e.g., based on the reliability of the user generating the answer or the confidence in the unambiguity of the extracted fact from the update.) Based on these and other techniques, the collective knowledge and observations of the users of the social network may be aggregated into a queryable data set. Additionally, the social network may be configured with additional features, e.g., a user interface that promotes the contribution of facts in an unambiguous manner, an anonymizing technique that deters the identification of the contributor of a fact, and/or a fact solicitation and reward system, whereby the social network may accept requests from users regarding desired facts and may reward users of the social network who provide such facts.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a social network, wherein users may generate a personal representation in the form of a social profile, such as a set of personal descriptors of the user's identity, academic and professional background, and personal interests. Users may also form associations with other users of the social network, where such associations may represent familial relationships, friendships, acquaintanceships, academic and professional connections, and shared interests. The user may also consent to share the contents of the social profile with the associated users, either by affirmatively inviting an associated user to view a particular data item or by simply granting such other users access to the social profile, and may view the social profiles of the associated users. The users of the social network may also communicate through the delivery of various types of messages, such as private messages sent to one or more associated users or public messages that are shared with all of the associated users.

Figure 1:
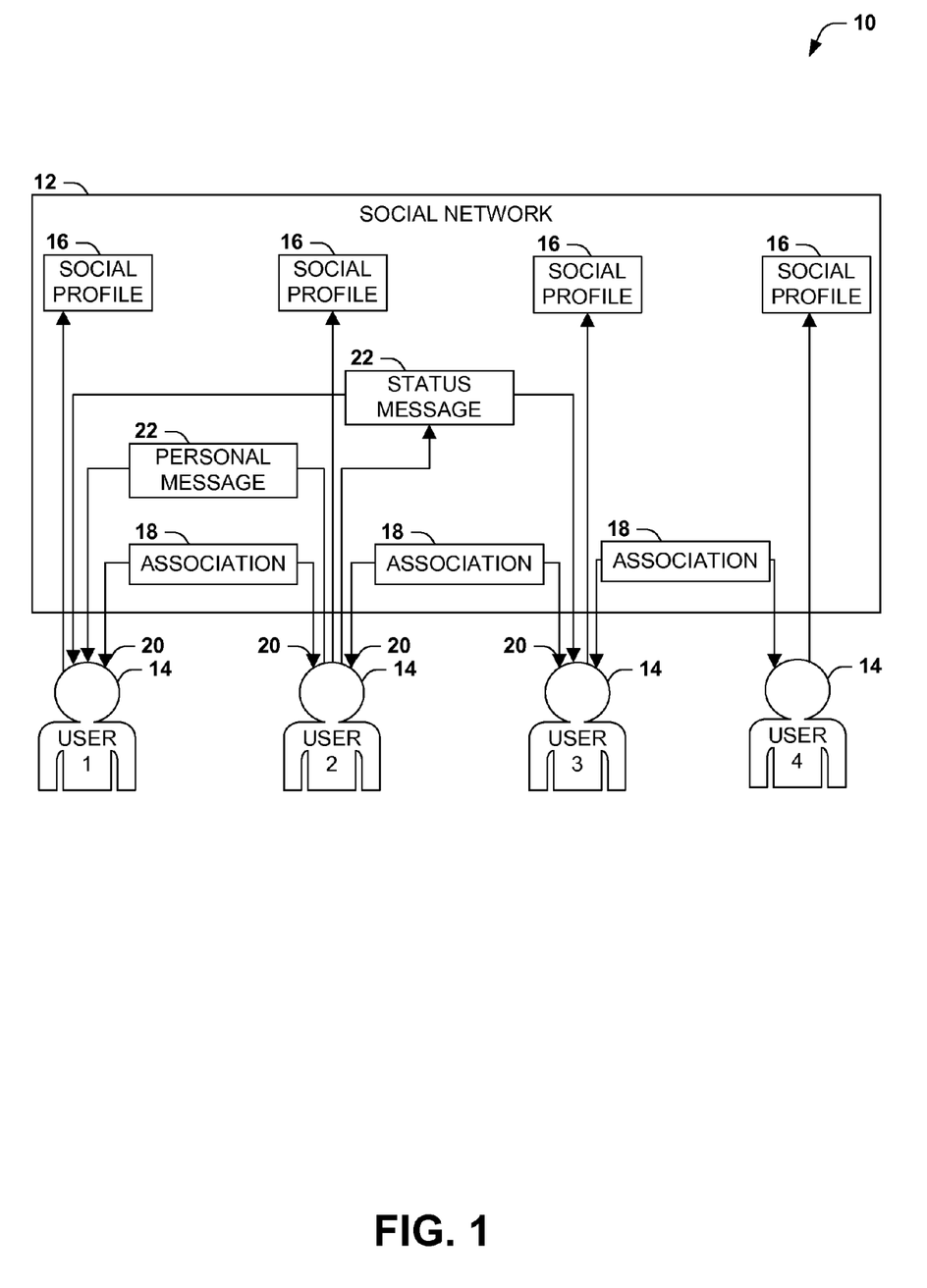
FIG. 1 is an illustration of an exemplary scenario featuring a social network comprising a set of users having social profiles and exchanging messages with associated users.

FIG. 1 presents an exemplary scenario 10 featuring a social network 12 comprising a set of users 14. Within the social network 12, each user 14 may create a social profile 16, such as a set of data items that describe the demographic information, academic and professional skills, and interests of the user 14. The users 14 may also establish associations 18 with other users 14, where such associations 18 may represent various types of relationships, such as familial connections, friendships, acquaintanceships, past or present academic or professional associations, shared interests, or joint membership in a group. A user 14 may therefore establish associations 18 with a set of associated users 20, representing the social connections of the user 14 within the social network 12, and may permit the associated users 20 to view some or all of the social profile 16 of the user 12. For example, within the exemplary scenario 10 of FIG. 1, a second user 12 may establish associations 18 with a set of associated users 20 including a first user 14 and a third user 14 of the social network 12, but may not have an association 18 with a fourth user 14 of the social network 12 who has an association 18 with the third user 14. Accordingly, the social profile 16 of the second user 14 may be accessible to the first user 14 and the third user 14 as associated users 20 of the second user 14, but may not be accessible to the fourth user 14.

Within the social network 12, a user 14 may generate many types of messages 22. For example, the second user 14 may generate a personal message 22 directed to the first user 14, which may be delivered by the social network 12 in various ways (e.g., as a public posting of the message 22, as a private message 22 held in a queue such as an email box, or as an instant message 22 that is promptly delivered to the first user 14.) The second user 14 may also generate a personal status message 22 that is viewable by all of the associated users 20 who have associations 18 with the user 14, but that is not viewable by other users 14, such as the fourth user 14. In this manner, a user 14 may specify limited control over the public distribution of the message 22.

Within the social network 12, many types of such messages 22 may be exchanged. These messages 22 may include many types of information, such as personal opinions, emotions, ideas, and observations of the user 14 (e.g., "I'm having a great time on vacation!" and "I love the nice weather here!") Conventional social networks 12 are configured to store the messages 22 and to deliver them to the recipients of the messages 22 in various ways, and may also perform limited evaluation of the messages 22, e.g., by identifying one or more topics discussed in the message 22 in order to select and present targeted advertisements that relate to such topics, or by indexing the contents of the messages 22 in order to permit rapid searching. These messages 22 are often casual or ephemeral in nature (e.g., a personal status message 22 may only have value to the author of the status message 22 as long as other users 14 are demonstrating an interest in the message 22, such as by viewing or commenting on the message 22, and the user 14 may not be interested in having the social network 12 retain the message 22 for a long duration.) Therefore, conventional social networks 12 often handle the messages 22 as trivial data, and may dispose of messages 22 after the perceived value of the message 22 to the user has likely expired.

However, while many messages 22 exchanged in a social network 12 may primarily have value only to the author of the message 22 and some associated users 20 (such as users 14 targeted by or mentioned in the message 22), many of these messages 22 may also contain some factual items that may be of more general interest. As a first example, a user 14 may post two messages reading: "I'm having a great time on vacation!" and "I love the nice weather here!" While these messages 22 about the experiences of the user 14 might be directly valuable only to associated users 20 who are interested in the experiences of the user 14 (such as friends and family members), certain facts may be extracted from these messages 22. For example, the first message 22 may include a geotag (such as a combination of latitude and longitude coordinates) that indicate where the user 14 was located while generating the message 22, thereby establishing the presence of the user 14 in that location at the time the first message 22 was authored. Similarly, the second message 22 may indicate that the weather "nice" at the time of the second message 22 in this location (presuming that the second message 22 was generated around the same time as the first message 22 and suggests that the user 14 was located in the same place.) The "nice" quality of the weather may be compared with information about what types of weather is considered "nice" among the users 14 of the social network 12, or even specifically what types of weather are considered "nice" by the user 14 who generated the message 22, in order to infer a possible weather report for the location.

Figure 2:
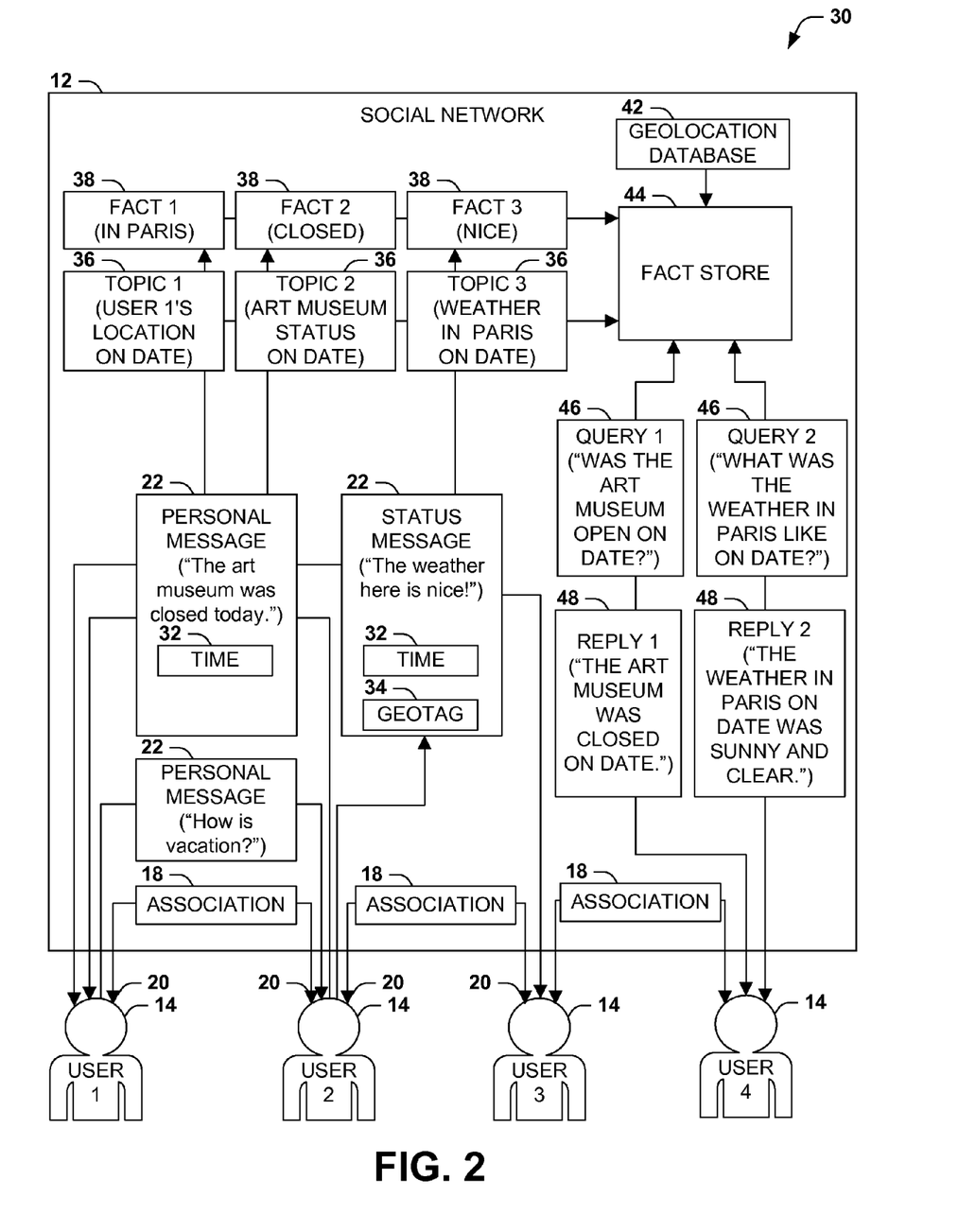
FIG. 2 is an illustration of an exemplary scenario featuring an extraction of facts from the messages of users exchanged in a social network in accordance with the techniques presented herein.

FIG. 2 presents an exemplary scenario 30 featuring a set of users 14 of a social network 12 who may establish associations 18 with other users 14. In this exemplary scenario 30, the users 14 may generate messages 22 that may be evaluated to extract facts. For example, a second user 14 may establish associations 18 with two associated users 20, including a first user 14 and a third user 14. The second user 14 may then send receive from the first user 14 a first personal message 22 asking about the status of a vacation undertaken by the second user 14, and the second user 14 may reply with a second personal message 22 indicating that a museum that the second user 14 intended to visit was closed on the day that the second message 20 were generated. These messages 22 might only be viewable by the first user 14 and the second user 14, or might be viewable by associated users 14 who have an association with the first user 14 and/or the second user 14 (such as the third user 14), or might be publicly viewable by all users 14 of the social network 12. The second user 14 may also generate a status message 22 indicating that the weather in the current location of the second user 14 is nice. This status message 22 might also be viewable only by associated users 20 who have an association 18 with the second user 14, or might be publicly viewable by any user 14. In this manner, the users 14 may generate messages 22 to be delivered to other users 14 of the social network 12.

As further illustrated in the exemplary scenario 30 of FIG. 2, the social network 12 may be configured to deliver the messages 22 according to the communications channels (e.g., email messaging, instant messaging, or chat messaging) and privacy parameters pertaining thereto. However, the social network 12 may also be configured to evaluate these messages 22 in order to identify and extract one or more facts indicated in the content of the messages 22. As a first example, the status message 22 of the second user 14 ("the weather here is nice") may be difficult to interpret in isolation, but the status message 22 may be associated with a time 32 indicating when the weather in the location of the second user 14 was observed to be "nice," and a geotag 34 (such as a pair of latitude and longitude coordinates) that indicates the location of the second user 14 at the time of authoring the status message 22. The geotag 34 might be compared with a geolocation database 42 to identify the location referred to by the second user 14 in the status message 22 (such as Paris), and may therefore conclude that the weather in this location qualified as "nice" as of the time 32 of the status message 22. Moreover, the "nice" qualification may be mapped to a set of specific and inferred conditions about the location of the second user 14, either based on a conventional usage of the term (e.g., users 14 typically consider "nice" weather to fall within the temperature range of 70 degrees to 79 degrees and with little or no cloud cover) or based on the specific preferences of the user 14 generating the message 22. In this manner, the social network 14 may infer that, according to the status message 22 of the second user 14, the weather in Paris at a particular date and time was within a particular range of weather conditions. This inference may be evaluated as a topic 36 (e.g., "the weather in Paris on a particular date") and a fact 38 (e.g., qualitatively described as nice," or predicted as having quantitative properties of temperature and cloud cover.) As a second example, the second personal message 22 generated by the second user 14 ("the art museum was closed today") may not reveal significant facts in isolation. However, the second message 22 may be associated with a time 32 indicating the date on which the art museum was closed, and if the time 32 of the second message 22 is close to the time 32 of the status message 22, the geotag 34 of the status message 22 may also be attributed to the personal message 22 to suggest the particular art museum mentioned in the second message 22 (e.g., possibly the Louvre.) The information in this second message 22 (supplemented with the information from the status message 22) may suggest a first topic 36 (e.g., the location of the second user 14 at a particular time 32) and a first fact 38 (e.g., Paris, France), and a second topic 36 (e.g., the status of an art museum in Paris, France, possibly the Louvre, at a particular time 32) and a second fact 38 (e.g., the art museum was closed.)

In this manner, the social network 12 may be configured to evaluate the messages 22 generated by various users 14 and to extract facts 38 associated with various topics 36. These topics 36 and facts 38 may be stored in a fact store 44, which may be queried about particular topics 36 and facts 38 associated therewith. For example, a fourth user 14 may submit to the social network 12 one or more queries 46 about particular topics 36 (e.g., a first query 46 regarding the status of an art museum in Paris, France at a particular time 32, and a second query 46 regarding the weather in Paris, France at a particular time 32.) The social network 12 may apply these queries 46 to the fact store 44, and may retrieve any facts 38 stored in the fact store 44 that are related to the topics 36 identified in the queries 46. For example, based on the messages 22 of the second user 14, the fact store 44 may store a topic 36 and fact 38 that are responsive to the first query 46, and the social network 12 may fulfill the first query 46 by sending to the fourth user 14 a first reply 48 indicating that the art museum referenced in the first query 46 was closed at the referenced time 32. Similarly, the fact store 44 may store a topic 36 and fact 38 that are responsive to the second query 46, and the social network 12 may fulfill the second query 46 by sending to the fourth user 14 a second reply 48 indicating that the weather in Paris, France at the referenced time 32 was sunny and clear (which may have been inferred from the description of the weather as "nice" in the status message 22 of the second user 14.) The social network 12 may also utilize other features in fulfilling such queries 46 (e.g., because the fourth user 14 does not have an association 18 with the second user 14, the social network 12 may only fulfill the queries 46 of the fourth user 14 using topics 36 and facts 38 that are not personal to the second user 14, or that are affirmatively anonymized, whereas the associated users 20 having an association 18 with the second user 14 may be permitted to submit queries 46 pertaining to topics 36 and facts 38 that are personal to the second user 14.)

Figure 3:
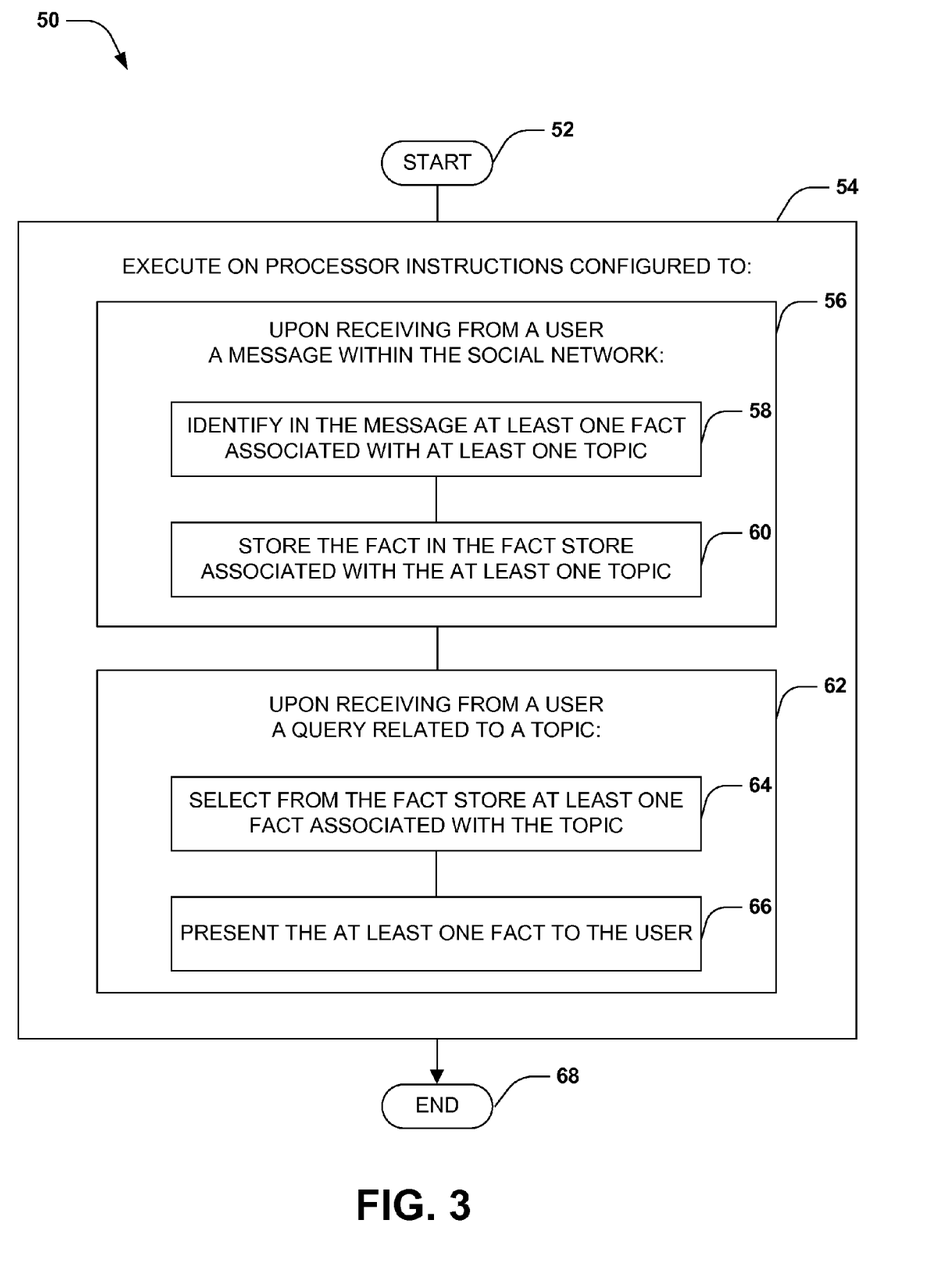
FIG. 3 is a flowchart illustrating an exemplary method of presenting facts extracted from messages generated by users within a social network.

FIG. 3 presents a first embodiment of these techniques, illustrated as an exemplary method 50 of presenting facts 38 associated with at least one topic and extracted from a social network 12. The exemplary method 50 may be implemented, e.g., as a set of software instructions encoded on a volatile or nonvolatile memory device (such as system memory, a hard disk drive, a solid state storage device, or an optical or magnetic disc), and that may be executed on a processor of a device having a fact store 44. The exemplary method 50 begins at 52 and involves executing 54 on the processor instructions configured to perform the techniques presented herein. In particular, the instructions are configured to, upon receiving 56 from a user 14 a message 22 within the social network 12, identify 58 in the message 22 at least one fact 38 associated with at least one topic 36, and store 60 the fact 38 in the fact store 44 associated with the topic 36. The instructions are also configured to, upon receiving 62 from a user 14 a query 46 related to a topic 36, select 64 from the fact store 44 at least one fact 38 associated with the topic 36, and present 66 the at least one fact 38 to the user 14. Having fulfilled the query 46 through the presentation of facts 38 extracted from the messages 22 of the social network 12, the exemplary method 50 ends at 68.

Figure 4:
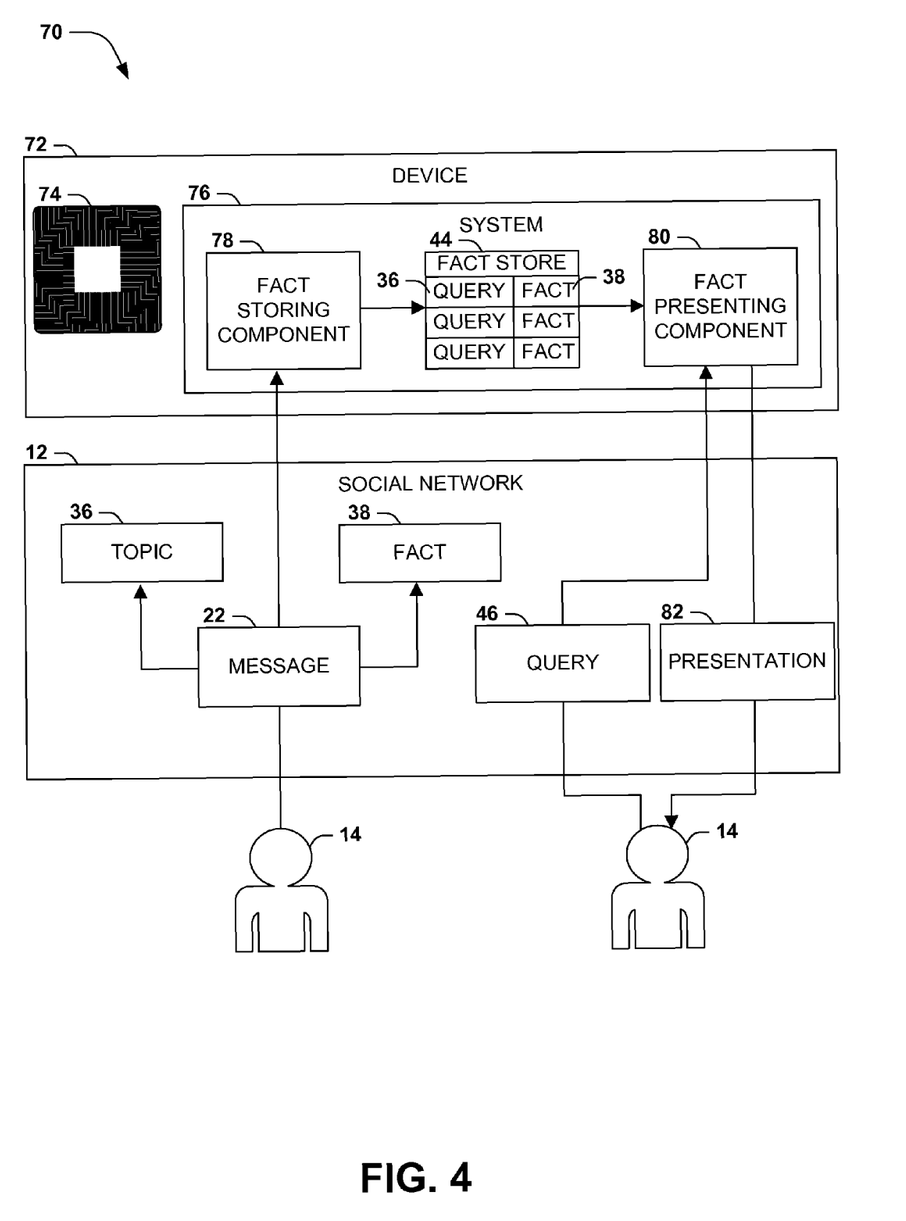
FIG. 4 is a component block diagram illustrating an exemplary system for presenting facts extracted from messages generated by users within a social network.

FIG. 4 presents a second embodiment of these techniques, illustrated as an exemplary system 76 configured to present facts 38 extracted from a social network 12. The exemplary system 76 operates within a device 72 having a processor 74 and may comprise, e.g., a set of components implemented as hardware devices and/or software instructions stored in a memory of the device 72. The exemplary system 76 comprises a fact store 44 that is configured to store at least one fact 38 associated with at least one topic 36 (e.g., a database storing a set of topics 36 and facts 38 as key/value pairs.) The exemplary system 76 also comprises a fact storing component 78, which is configured to, upon receiving from a user 14 a message 22 within the social network 12, identify in the message 22 at least one fact 38 associated with at least one topic 36, and store the fact 38 in the fact store 44 associated with the topic 36. The exemplary system 76 also comprises a fact presenting component 80, which is configured to, upon receiving from a user 14 a query 46 related to a topic 36, select from the fact store 44 at least one fact 38 associated with the topic 36, and present the at least one fact 38 to the user 14 (e.g., in a presentation 82, either as a human-readable document such as a web page, or as a machine-readable document such as a data set formatted according to an extensible markup language (XML) schema.) In this manner, the interoperating components of the exemplary system 76 achieve the extraction of facts 38 associated with topics 36 from the messages 22 of the social network 12.

Figure 5:
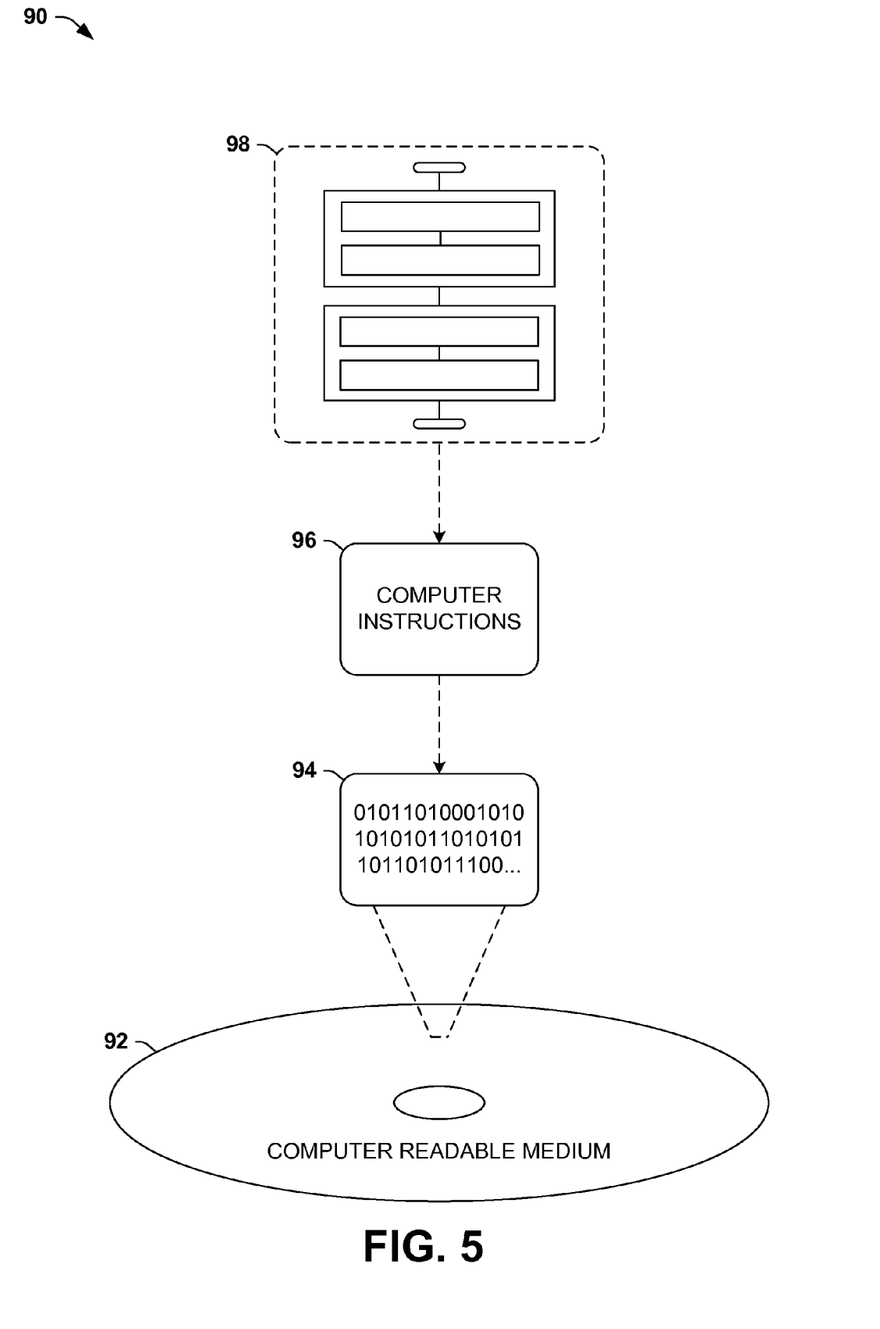
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of presenting facts extracted from messages generated by users within a social network, such as the exemplary method 50 of FIG. 3. In another such embodiment, the processor-executable instructions 96 may be configured to implement a system for presenting facts extracted from messages generated by users within a social network, such as the exemplary system 76 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein these techniques may be utilized. As a first example, these techniques may be used to extract facts 38 from many types of social networks 12, including genealogy social networks representing familial associations, academic social networks representing academic associations (such as classmates or student/teacher relationships), dating social networks representing romantic connections, and gaming social networks representing teammate and opponent connections. As a second example of this first aspect, these techniques may be applied to extract facts 38 from many types of messages 22 exchanged over the social network 12, including textual messages, images, audio or video recordings, and many types of data objects (such as uniform resource identifiers (URIs) that reference web resources of interest to a user 14.) Additionally, these techniques may be utilized to examine messages 22 exchanged over many types of communication channels within a social network 12, such as instant messages and other chat messages that are promptly delivered, messages that are enqueued (such as resembling an email communication system), and a news feed or bulletin-board communication system. Those of ordinary skill in the art may devise many such scenarios wherein the techniques presented herein may be advantageously implemented.

A second aspect that may vary among embodiments of these techniques relates to the architectures of various implementations. As a first example, an embodiment of these techniques may operate within the social network 12, e.g., as components integrated with the logic of the message receipt and delivery systems of the social network 12. Alternatively, an embodiment of these techniques may operate outside of the social network 12, e.g., as an external system that receives a feed of messages 22 posted within the social network 12 and that endeavors to extract facts 38 therefrom. In one such embodiment, a client machine operated by a user 14 of the social network 12 may include an embodiment of these techniques, e.g., to create a factual database of the facts expressed in messages 22 encountered by the user 14. As a second example of this second aspect, the architectures of these techniques may vary in the number, configuration, and interaction of components. In a first such variation, while the exemplary method 50 of FIG. 3 comprises an exemplary embodiment of these techniques, other exemplary methods may also be devised; e.g., facts 38 might be extracted from various messages 22 within the social network 12 after receiving a query 46 from a user 14 about a topic 36 associated with such facts 38. In a second such variation, the components of the exemplary system 76 in the exemplary scenario 70 of FIG. 4 may vary in number, configuration, and interoperation; e.g., the fact store 44 might be implemented as a portion of the message store that is configured to store messages 22, and a system embodiment of these techniques may omit a separate fact store 44 and may simply annotate the messages 2 stored in the message store. Those of ordinary skill in the art may devise many suitable architectures that may adequately implement the techniques presented herein.

A third aspect that may vary among embodiments of these techniques relates to the manner of identifying topics 36 and facts 38 in a message 22 within the social network 14. As a first example, the message 22 may semantically evaluate each message 22 using natural language parsing techniques, and possibly utilizing linguistic concepts such as conversational context, to understand the semantics of the message 22 and to identify and extract any facts 38 contained therein. Image- and video-based messages 22 may similarly be evaluated through the application of machine vision techniques, while speech recognition techniques may be applied to evaluate audio-based messages 22. However, these approaches may be computationally intensive and may not scale well to the volume of messages 22 received over the social network 12.

As a second example of this third aspect, some topics 36 and facts 38 may be identifiable based on the formatting of the information within the message 22. As a first variation, a message 22 may contain an instance of a date or time, which may be well-formatted in a detectable manner (e.g., a date may often be written according to a standardized format such as "dd/mm/yyyy" or "mm/dd/yyyy", while a time may often be written according to a standardized format such as "hh:mm" or "hh:mm:ss", and these formats may be specified in corresponding regular expressions that may be matched against a textual portion of a message 22.) An embodiment may therefore be configured to identify within a message 22 a time associated with a fact 38, and to store the fact 38 in the fact store 44 associated with the topic 36 and the time specified in the message 22. Additionally, the embodiment may accept a query 46 specifying a time (e.g., "the weather in Paris, France at 6:00 on Sep. 1, 2009"), and, while selecting 64 facts 38 from the fact store 44 to fulfill the query 46, may select only facts 38 associated with the time specified in the query 46. As a second such variation, a message 22 may contain a reference to one or more locations, such as a proper name (e.g., "Paris, France") or a recognizable nickname (e.g., "the City of Lights"), an address, or a geotag, such as a set of latitude and longitude coordinates. These references to locations may also be automatically identifiable, and an embodiment may be configured to identify within a message 22 a location associated with a fact 38, and to store the fact 38 in the fact store 44 associated with the topic 36 and the location specified in the message 22. Additionally, the embodiment may accept a query 46 specifying a location (e.g., "the weather in Paris, France at 6:00 on Sep. 1, 2009"), and, while selecting 64 facts 38 from the fact store 44 to fulfill the query 46, may select only facts 38 associated with the location specified in the query 46. Many other types of automatically detectable facts 38 may be identified, and embodiments may be configured to detect many types of facts 38 in this automated manner.

As a third example of this third aspect, an embodiment of these techniques may utilize a fact schema, wherein a set of topics 36 is defined along with a set of facts 38 that may be associated therewith. A user 14 may, while generating a message 22, specify in the message 22 at least one fact 38 according to the fact schema (e.g., including a particular identifier that is associated with a fact 38 associated with a topic 36 in the fact schema), and the embodiment may detect this inclusion and thereby identify that the message 22 relates to the fact 38. This example may be advantageous, e.g., for standardizing the manner whereby topics 36 and facts 38 are specified in messages 22, and for permitting such specification by users 14 in an unambiguous manner.

Figure 6:
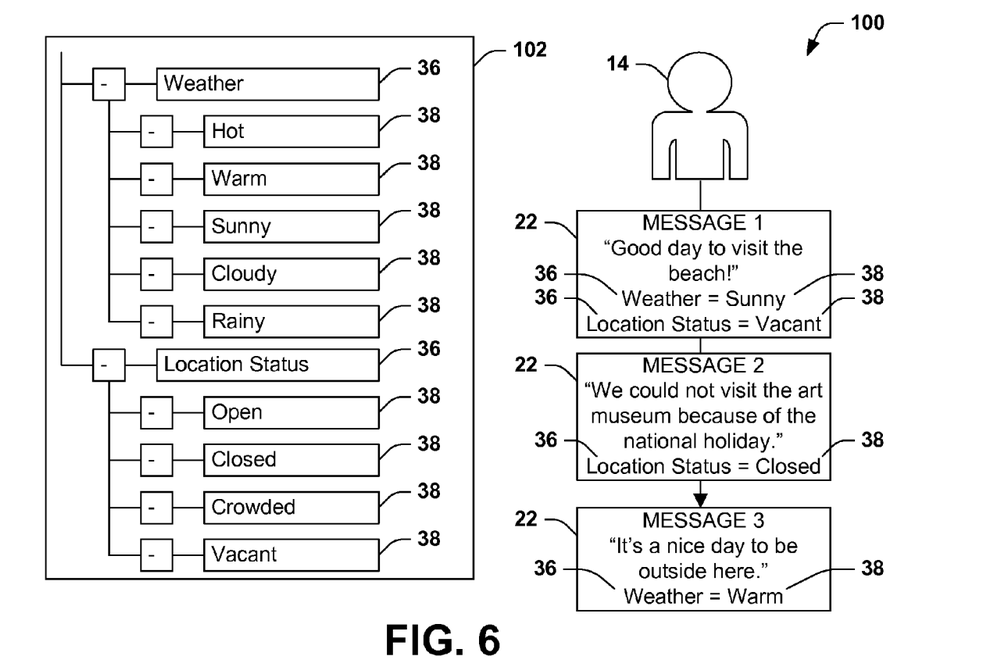
FIG. 6 is an illustration of an exemplary scenario featuring an identification of facts included in messages in a social network according to a fact schema.

FIG. 6 presents an exemplary scenario 100 featuring a fact schema 102, which is defined as a hierarchical organization of topics 36 and a set of facts 38 associated therewith. For example, a first topic 36 may relate to a weather condition that may be referenced in a message 22 (which may include other information, such as metadata, that further refine the topic to reference a weather condition in a particular location and at a particular time), and facts 38 associated with the topic 36 may describe the weather condition (e.g., hot, sunny, cloudy, and rainy.) A second topic 36 may relate to a location status (e.g., a report of conditions of a public park or building), and may include facts 38 such as "open," "closed," "crowded," and "vacant." When a user 14 generates a message 22 in the social network 12, the user 14 may author the body of the message 22 as a textual comment, but may also include one or more identifiers of topics 36 and associated facts 38. For example, a first message 22 may comprise a report that the user 14 is visiting a beach and is having a good time, but may also include a first topic 36 and a first associated fact 38 defined in the fact schema 102 (e.g., specifying the weather conditions at the beach as "sunny") and a second topic 36 and a second associated fact 38 defined in the fact schema 102 (e.g., specifying the location status of the beach as "vacant.") An embodiment of these techniques may detect the inclusion of the topic 36 and fact 38 pairs, and may extract such facts 38 from the messages 22 of the social network 12. In this manner, the fact schema 102 may be utilized to promote structure among the topics 36 and facts 38, standardization in the specification of the topics 36 and facts 38 in messages 22, and the ease of extraction of the facts 38 from the messages 22.

As a fourth example of this third aspect, topics 36 and facts 38 may be identified within messages 22 in the social network 12 according to less structured ways, such as the detection of keywords associated with various topic 36 and/or facts 38. For example, an embodiment may store a set of topical keywords associated with various topics 36 and/or a set of factual keywords associated with various facts 38, and may identify the topics 36 and facts 38 within a message 22 by detecting the presence of corresponding topical keywords and factual keywords. This example might be applied to the messages 22 in the exemplary scenario 100 of FIG. 6 by specifying the term "weather" as a topical keyword, and by specifying the terms "hot," "warm," "sunny," "cloudy," and "rainy" as factual keywords associated with the topical keyword "weather." A message 22 may be presumed to relate to this topic 36 and these facts 38 by including these keywords. This variation may be advantageous, e.g., as a comparatively simple natural-language processing technique that might extract facts 38 from a large variety of messages 22 without involving specialized formatting (such as according to a fact schema 102) and without consuming significant computational resources. However, this variation might exhibit a large number of false negatives (e.g., where the user misspells a keyword, such as "hot whether today," or uses a synonym for a keyword, such as "scorching weather today") and/or false positives (e.g., where the message 22 includes keywords but may not suggest the corresponding fact 38 to a human reader, e.g., "hot tea is great for this weather.")

As a fourth example of this third aspect, an embodiment of these techniques may present to a user 14 a user interface that promotes the association of topics 36 and facts 38 with messages 22. For example, a user interface may allow a user 14 of the social network 12 to input the textual comment of a message 22, but may then assist the user in selecting one or more topics 36 relating to the message 22, and also one or more facts 38 associated with the selected topics 36. This user interface might utilize a fact schema 102, e.g., as an internal representation of topics 36 and facts 38 that may populate controls within the user interface and/or facilitate the storage of selected topics 36 and facts 38. Alternatively or additionally, the user interface might utilize various predictive techniques to predict the topics 36 and facts 38 that are associated with a message 22 (e.g., by detecting topical keywords and/or factual keywords in the message 22), and might use such predictions to suggest relevant topics 36 and facts 38 to the user 22 in order to improve the efficiency of the user interface. The user interface might also inform the user 14 regarding the submission of facts 38; e.g., if the user 14 submits a message 22 including an uncommon topical keyword or an uncommon factual keyword (e.g., a term that is occasionally but seldom used to identify a particular topic 36 or fact 38), the user interface may suggest to the user 14 a common topical keyword or a common factual keyword that are used by other users with greater frequency (or, perhaps, with less ambiguity) to refer to the same topic 36 or fact 38.

Figure 7:
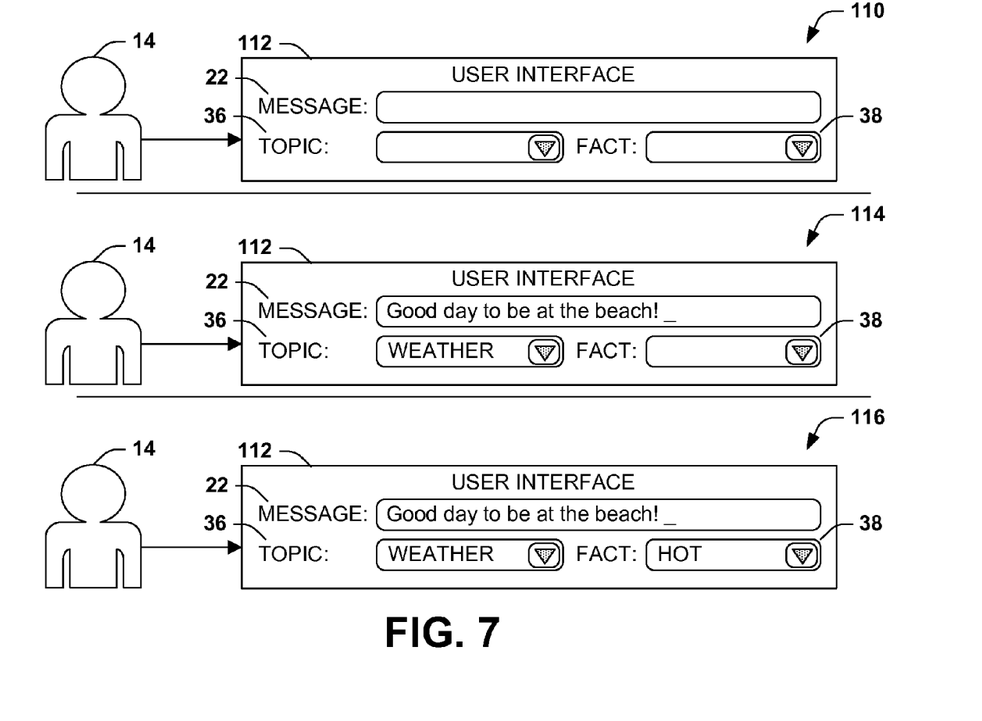
FIG. 7 is an illustration of an exemplary scenario featuring a user interface configured to facilitate a user in including facts in messages in a social network.

FIG. 7 presents an exemplary scenario featuring a user interface 112 that assists a user 14 in generating a message 22 associated with a topic 36 and a fact 38. At a first time 110 in this exemplary scenario, the user interface 112 might present a textbox that is configured to accept from the user 14 a textual comment of the message 22. At a second time point 114, the user interface 112 may allow the user 14 to select a topic 36 (e.g., through a first drop-down list user control loaded with the names of topics 36, possibly as represented in a fact schema 102.) The user interface 112 might also predict a topic 36 associated with the message 22 based on a lexical evaluation of the textual comment, and may suggest this topic 36 to the user, e.g., by pre-loading the topic user control with the predicted topic 36. At a third time point 116, after the user 14 has selected a topic 36 associated with the textual message 22, the user interface 112 may present a list of facts 38 that may be associated with the topic 36 and the message 22 (e.g., as a second drop-down list user control loaded with the names of facts 38 associated with the selected topic 36.) The user interface 112 might also predict a fact 38 associated with the message 22 and the topic 36 based on a lexical evaluation of the textual comment, and may suggest this fact 38 to the user, e.g., by pre-loading the fact user control with the predicted fact 38. In this manner, the user interface 112 may facilitate the user 14 in generating the message 22 associated with a topic 36 and a fact 38. Moreover, the input of the user 14 in this context might be comparatively efficient for the user 14 and for the computational resources of the device hosting the user interface 112.

A fifth example of this third aspect relates to the possibility of unreliability in the extraction of a fact 38 from a message 22 of a user 14. Many factors may render the extraction of the fact 38 from the message 22 unreliable. For example, the message 22 may not have been intended as factual but fictional or satirical; the user 14 may have intended the message 22 to report a fact 38, be mistaken or untruthful about the fact 38; or the parsing of the message 22 may be inaccurate due to typographical errors, ambiguity, lack of context, or imperfect natural-language evaluation techniques. However, the reliability of the fact 38 may increase in view of a multitude of reports of the fact 38 in many messages 22 by many users 14. Therefore, rather than recording a fact 38 in the fact store 44 based on one message 22 written by one user 14, an embodiment of these techniques may be configured to identify a fact 38 and record the fact 38 in the fact store 44 only after receiving a message set comprising at least two messages 22 submitted within the social network 12 by different users 22 that each include the fact 38. For example, an embodiment may track a predicted confidence in a fact 38 according to the number, variety, and unambiguity of messages 22 reporting the fact 38 submitted by a diverse set of users 22, and may record the fact 38 in the fact store 44 only upon transcending a specified confidence threshold. This example may also present an added advantage of anonymizing the fact 38 through the aggregation of the fact 38 from many sources.

A further variation of this fifth example of this third aspect may resolve contradictions among facts 38 reported by various users 14. For example, a first user 14 may submit a first message 22 indicating a first fact 38 about a particular topic 36, and a second user 14 may submit a second message indicating a second fact 38 about the same topic 36 that contradicts the first fact 38 (e.g., contradictory reports that the weather condition in a particular area at a particular time of day is "hot" and "cold.") Such contradictions may arise, e.g., through errors in extracting the fact 38 from one or more messages 22, from differences of opinion among the users 14, from limitations in a fact schema 104 (e.g., a conflation of a single weather report for a location from several messages 22 reported in a region having localized weather variations), or an effort by a user 14 (or even a potentially large group of users 14) to plant false or inaccurate information in the fact store 44. In these cases, an embodiment of these techniques may be configured to, upon detecting a contradiction among two or more facts 38 reported on a particular topic 36 in the messages 22 of a message set, select a particular fact 38 to be stored in the fact store 44, and discard the contradictory facts 38. This selection may be based on many factors, such as the confidence in the extraction of the respective facts 38 from the messages 22, a consensus among the users 22, the plausibility of respective facts 38, and the past reliability of previously reported facts 38 by the users 22 involved in the contradictory facts 38. An embodiment may also seek verification, e.g., by asking other users 14 of the social network 12 (possibly selected at random, or among a pool of reliable users 14) to verify a fact 38 or to select among the contradictory facts 38, or by seeking independent verification from data sources outside of the social network 12. In this manner, the embodiment may seek to reduce contradictions among the facts 38 stored in the fact store 44 and to promote the reliability of the information contained therein. Those of ordinary skill in the art may devise many ways of extracting facts 38 from messages 22 submitted by various users 14 of the social network 12 while implementing the techniques presented herein.

A fourth aspect that may vary among embodiments of these techniques relates to the manner of presenting the facts 38 in response to various queries 46 received from users 14 of the social network 12. As a first example, a query 46 may be submitted by a user 14 regarding a particular topic 36 (e.g., "what was the weather condition in Paris, France on Sep. 10, 2010?") with which may be associated a fact 38 in the fact store 44, and the fact 38 may simply be presented to the user 14. The presentation 82 of the fact 38 might also identify the user 14 who submitted the fact 38, and the user 14 may even be permitted to request in the query 46 facts 38 specified by particular users 14, such as the set of associated users 20 who have an association 18 with the user 14 submitting the query 46. Alternatively, an embodiment of these techniques may endeavor to anonymize the fact 38, and to present to the user 14 an anonymized fact 38 based on the fact 38 stored in the fact store 44.

As a second example of this fourth aspect, the presentation 82 of facts 38 may be presented in other ways than simply a single reported fact 38. As a first variation of this second example, a query 46 may request facts 38 regarding the weather conditions in a particular location over a particular period. An embodiment may select from the fact store 44 several facts 38 comprising weather reports in this location at several times within the specified period, and may generate and present in response to the query 46 a graphical representation of weather trends during this period (such as temperature fluctuations.)

Figure 8:
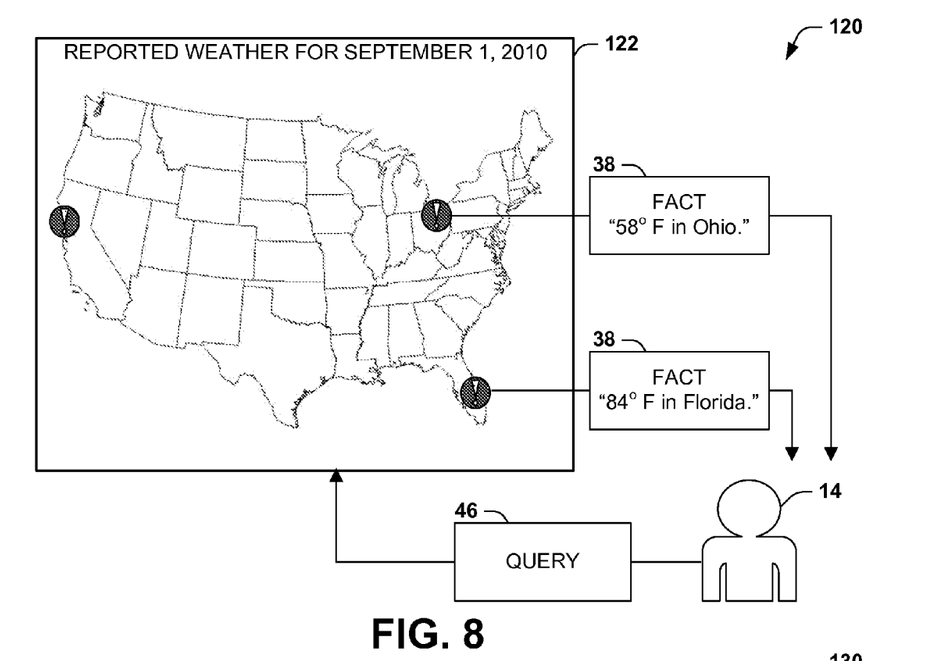
FIG. 8 is an illustration of an exemplary scenario featuring a presentation of facts extracted from messages in a social network in the form of a map.

FIG. 8 presents an exemplary scenario 120 featuring a second variation of this second example of this fourth aspect, wherein a user 14 submits a query 46 requesting information on weather conditions across the United States reported for a particular time by the users 14 of the social network 12. An embodiment may identify several such facts 38 specified for various locations (such as cities) within the United States for the particular time, and may generate and send to the user 14 a presentation 82 comprising a map 122 of the United States, with various indicators representing the particular locations of the facts 38 that are responsive to the query 46. The user 14 may then select one of the indicators, and may be presented with the corresponding fact 38 describing the weather condition reported by at least one user 14 of the social network 12 for the selected location at the time specified in the query 46. In this manner, the embodiment may achieve a useful presentation 82 of the facts 38 selected in response to the query 46. Those of ordinary skill in the art may devise many ways of receiving and evaluating queries 46 and of presenting facts 38 identified as responsive thereto while implementing the techniques presented herein.

A fifth aspect that may vary among embodiments of these techniques relates to soliciting users 14 of the social network 12 to submit messages 22 containing one or more desired facts. As a first scenario, the social network 12 may identify a desired fact that is missing in the fact store 44, such as a fact 38 that is missing from a set of facts 38 that otherwise comprise a complete trend line. As a second scenario, a user 14 may submit a query 46 requesting a fact 38 that is not present in the fact store 44. In such scenarios, an embodiment of these techniques may be configured to send to one or more users 14 of the social network 12 a solicitation for a message 22 including the desired fact. As a first such variation, the social network 12 may be able to identify one or more particular users 14 within the social network 12 who may know the desired fact (e.g., if the desired fact comprises a weather condition in a particular location at a particular time, the social network may identify one or more users 14 who may be or may have been present in that location at that time), and may specifically send the solicitation to these particular users 14. As a second such variation, the social network 12 may include in the solicitation an offer for a reward for submitting the fact 38, e.g., an acknowledgment of the user 14 as the reporter of the desired fact, a micropayment reward, an award of points in a point system, or an offer to receive and broadcast a similar query 46 from the user 14 who first provides the desired fact. This reward may be selected by the social network 12 (e.g., a standard point value or micropayment, or a graded reward system based on the promptness, detail, or reliability of the submission of the desired fact), or may be specified by the user 14 submitting the query 46 for the desired fact (e.g., as a bidding system, where users 14 may specify higher rewards for messages 22 that are submitted more promptly or with more detail or reliability.) In either case, the embodiment may be configured to, upon receiving from a user 14 of the social network 12 a message 22 including the desired fact, deliver the specified reward to the user 14.

Figure 9:
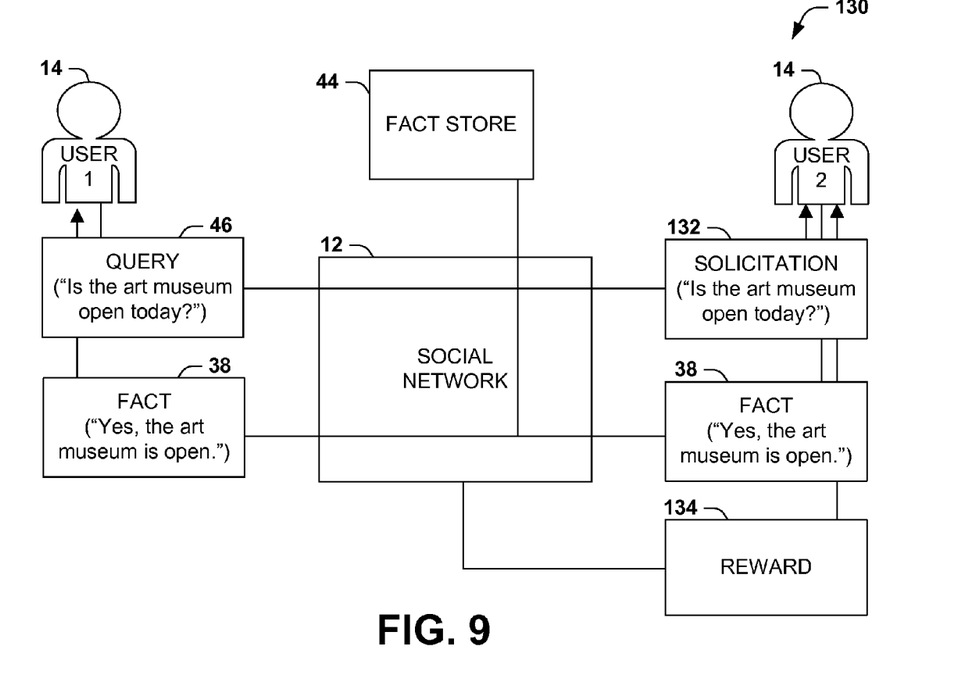
FIG. 9 is an illustration of an exemplary scenario featuring a solicitation of a fact from a second user of a social network in response to an offer from a first user of the social network.

FIG. 9 presents an illustration of an exemplary scenario 130 featuring a first user 14 who submits a query 46 specifying a topic 36 regarding the location status of a particular location. An embodiment of these techniques operating within the social network 12 may examine the fact store 44 to retrieve one or more facts 38 associated with the topic 36, but may fail to find any such fact 44. The embodiment may therefore send a solicitation 132 to one or more other users 14 of the social network 12 (including a second user 14) for the desired fact. Upon receiving from the second user 14 a message 22 comprising the fact 38, the embodiment may store the fact 38 in the fact store 44, and may present the fact 38 to the first user 14 in response to the query 46. Additionally, the social network 12 may send to the second user 14 a reward 134 for providing the desired fact, such as a micropayment or one or more points that may be redeemable for various services within the social network 12. In this manner, the embodiment may solicit desired facts from users 14 of the social network 12 in order to respond to a query 46 associated with the topic 36 associated with the desired fact, and may reward users 14 for submitting such desired facts 38 in messages 22. Those of ordinary skill in the art may devise many ways of soliciting desired facts and rewarding users 14 who submit such facts 38 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
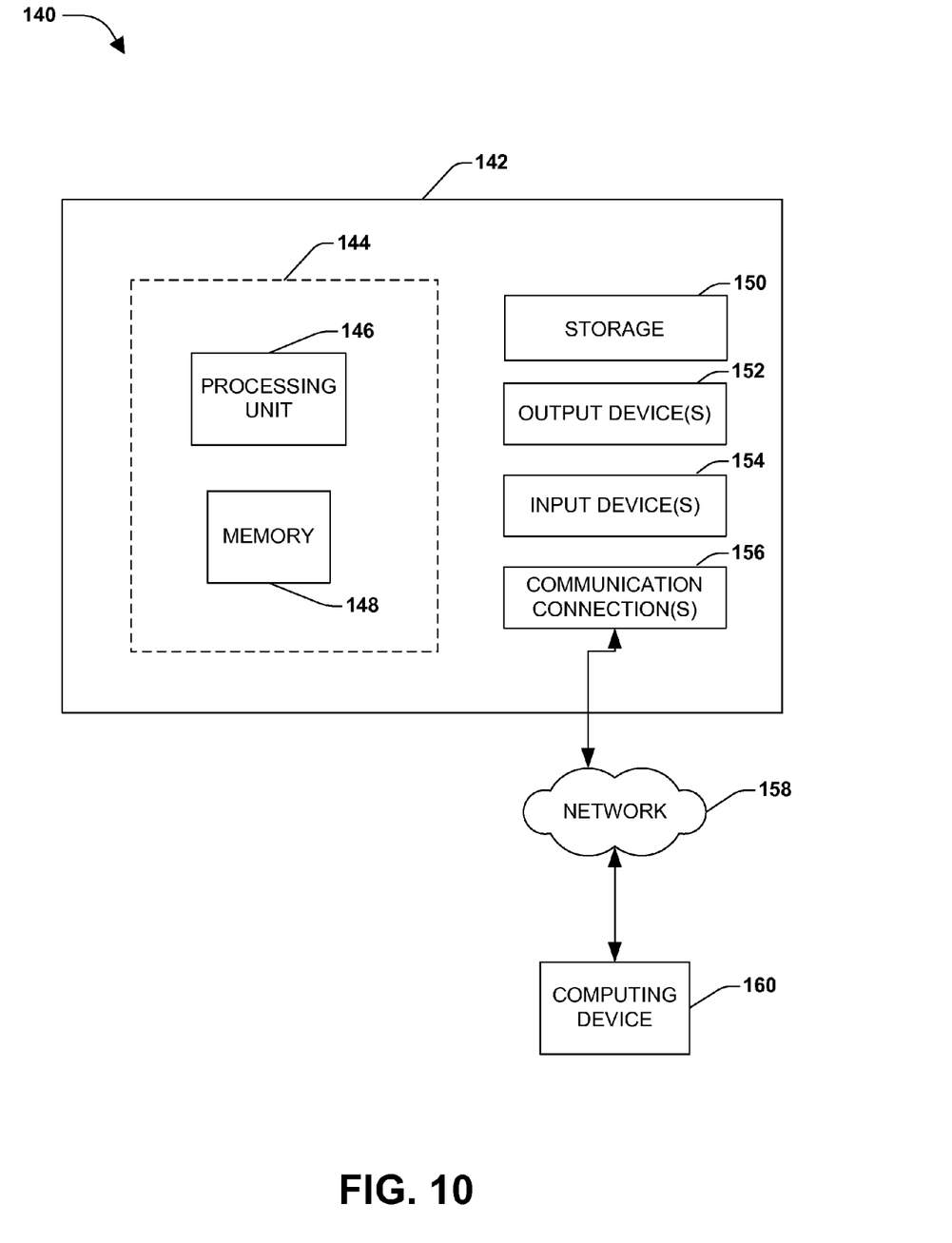
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 10 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 10 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting facts extracted from a social network on a device having a processor and a fact store, respective facts associated with at least one topic, the method comprising:
    executing on the processor instructions configured to:
        upon receiving from a user within the social network a message conveying a personal opinion of the user:
            identify in the message a reference identifying a topic associated with the personal opinion,
            translate the personal opinion in the message into at least one fact associated with the topic identified by the reference and not explicitly stated in the message, and
            store the fact in the fact store associated with the topic; and
        upon receiving from a user a query related to a topic:
            select from the fact store at least one fact associated with the topic, and
            present the at least one fact to the user.

2. The method of claim 1:
    identifying the at least one fact comprising: identifying a time associated with the fact;
    storing the fact in the fact store comprising: storing the fact in the fact store associated with the topic and associated with the time; and
    selecting the at least one fact from the fact store comprising: selecting from the fact store at least one fact associated with the topic and associated with a time associated with the query.

3. The method of claim 1:
    identifying the at least one fact comprising: identifying at least one location associated with the fact;

storing the fact in the fact store comprising: storing the fact in the fact store associated with the topic and associated with the at least one location; and selecting the at least one fact from the fact store comprising: selecting from the fact store at least one fact associated with the topic and associated with a location associated with the query.

4. The method of claim 3, identifying the location associated with the fact comprising: identifying within the message at least one geotag identifying a location associated with the message.

5. The method of claim 3, the presenting comprising: presenting a map comprising the location of the at least one fact selected from the fact store, the map overlaid with at least one fact positioned on the map according to the location associated with the fact.

6. The method of claim 1:
the fact store defining a fact schema specifying an organizational structure of the topics and the facts; and
identifying the at least one fact comprising: identifying within the message at least one fact schema identifier that identifies at least one of the topic and the fact associated with the topic.

7. The method of claim 1, identifying the at least one fact comprising:
identifying the topic in the message by detecting within the message at least one topical keyword associated with the topic.

8. The method of claim 7:
at least one topic associated with at least one common topical keyword and at least one uncommon topical keyword; and
the instructions configured to, upon receiving from a user a message including at least one uncommon topical keyword associated with a topic, suggest to the user at least one common topical keyword associated with the topic.

9. The method of claim 1, identifying the at least one fact comprising:
identifying the fact in the message by detecting within the message at least one factual keyword associated with the fact.

10. The method of claim 1:
the instructions configured to present to the user submitting the message a user interface configured to receive messages including at least one fact associated with at least one topic; and
the message received through the user interface.

11. The method of claim 10:
the message ambiguously specifying at least one intended fact among at least two possible facts;
the user interface configured to, upon receiving the message: query the user to select at least one intended fact among the at least two possible facts; and
selecting the at least one fact from the fact store comprising: upon receiving from the user a selection of at least one intended fact among the at least two possible facts, selecting the at least one intended fact selected by the user.

12. The method of claim 1, identifying the at least one fact comprising:
upon receiving a message set comprising at least two messages, respective messages submitted within the social network by a user and including at least one fact associated with a topic, identifying the fact about the topic among the messages of the message set.

13. The method of claim 12:
a first fact in the message set comprising a first fact about the topic;
a second fact in the message set comprising a second fact about the topic that contradicts the first fact; and
identifying the at least one fact comprising: among the facts about the topic included in the messages of the message set, selecting a fact.

14. The method of claim 1, the presenting comprising: presenting to the user an anonymized fact based on the fact.

15. The method of claim 1:
the instructions configured to:
identify a desired fact associated with at least one topic, and
send to a user within the social network a solicitation for a message including the desired fact; and
the message received from the user in response to the solicitation.

16. The method of claim 15, identifying the desired fact comprising:
receiving from a user a query specifying the desired fact.

17. The method of claim 15, the sending comprising:
upon identifying a desired fact, identify at least one user within the social network who may know the desired fact; and
sending the solicitation for a message about the desired fact to the at least one user.

18. The method of claim 15:
the user submitting the query specifying a reward for the desired fact; and
the instructions configured to, upon receiving the message including the desired fact from the user, delivering to the user the reward from the user submitting the query.

19. A system configured to present facts extracted from a social network, the system comprising:
a fact store configured to store at least one fact associated with at least one topic;
a fact storing component configured to, upon receiving messages from at least two users within the social network:
identify in the respective messages a reference identifying a topic associated with the message;
identify in the respective messages at least one potential fact associated with the topic identified by the reference;
from the potential facts, identify at least one selected fact representing a consensus among the potential facts identified in the messages; and
store the at least one selected fact in the fact store associated with the topic; and
a fact presenting component configured to, upon receiving from a user a query related to a topic:
select from the fact store at least one fact associated with the topic, and
present the at least one fact to the user.

20. A computer-readable storage medium comprising instructions that, when executed by a processor of a device having a fact store, present facts extracted from a social network by:
presenting to a user of the social network a user interface configured to receive messages including at least one fact associated with at least one topic;
upon receiving from a user through the user interface a message within the social network:
upon determining that the message includes at least one uncommon topical keyword associated with a topic, suggesting to the user at least one common topical keyword associated with the topic;

identifying in the message at least one fact associated with at least one topic by detecting within the message at least one topical keyword associated with the topic and at least one factual keyword associated with the fact;

upon determining that the message ambiguously specifies at least one intended fact among at least two possible facts:
  querying the user to select at least one intended fact among the at least two possible facts, and
  upon receiving from the user a selection of at least one intended fact among the at least two possible facts, selecting the at least one intended fact selected by the user;

identifying a time associated with the fact; and storing the fact in the fact store associated with the topic and associated with the time;

upon receiving from a user a query related to a topic and associated with a time:
  upon determining that the fact store does not include a fact associated with the topic of the query:
    identifying at least one user within the social network who may know the fact;
    sending to a user within the social network a solicitation for a message including the fact and specifying a reward for the fact; and
    upon receiving the message including the fact from the user:
      storing the fact in the fact store associated with the topic, and
      delivering a reward to the user;
  selecting from the fact store at least one fact associated with the topic and associated with the time associated with the query; and
  presenting the at least one fact to the user.

* * * * *